(12) United States Patent
Lu

(10) Patent No.: US 7,698,488 B2
(45) Date of Patent: Apr. 13, 2010

(54) EXPANSION APPARATUS FOR EXPANSION CARD ON MOTHERBOARD

(75) Inventor: Yi-Chung Lu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 351 days.

(21) Appl. No.: 11/552,978

(22) Filed: Oct. 26, 2006

(65) Prior Publication Data

US 2008/0104297 A1    May 1, 2008

(51) Int. Cl.
*G06F 13/36* (2006.01)
(52) U.S. Cl. .................. 710/301; 710/300; 710/315
(58) Field of Classification Search ......... 710/300–307, 710/309–315, 8–12, 1, 62–64, 72
See application file for complete search history.

(56) References Cited

U.S. PATENT DOCUMENTS

| | | | |
|---|---|---|---|
| 5,802,325 A * | 9/1998 | Le Roux | 710/301 |
| 5,926,378 A | 7/1999 | DeWitt | |
| 7,203,788 B2 * | 4/2007 | Liu | 710/315 |
| 7,315,456 B2 * | 1/2008 | Mondor et al. | 361/788 |
| 7,334,071 B2 * | 2/2008 | Onufryk et al. | 710/312 |
| 2005/0088445 A1 * | 4/2005 | Gonzalez et al. | 345/502 |
| 2005/0278468 A1 * | 12/2005 | Freimark | 710/301 |
| 2006/0161717 A1 * | 7/2006 | Purwin | 710/315 |
| 2007/0101037 A1 * | 5/2007 | Lin et al. | 710/301 |
| 2007/0214299 A1 * | 9/2007 | Lo | 710/301 |
| 2008/0005372 A1 * | 1/2008 | Bolen et al. | 710/8 |

* cited by examiner

*Primary Examiner*—Raymond N Phan
(74) *Attorney, Agent, or Firm*—Wei Te Chung

(57) ABSTRACT

An expansion card apparatus for expanding a motherboard which complies with a first signal transmission standard with an expansion card which complies with a second signal transmission standard, includes a first slot which complies with the first standard, a second slot which complies with the second standard, an expansion slot, and a transforming card. The first slot, the second slot, and the expansion slot are defined on the motherboard. The expansion slot is configured for receiving the expansion card and electrically connects to the second slot. The transforming card includes a first connector connecting with the first slot, a second connector connecting with the second slot, and a transforming chipset for transforming form of signals between the first standard and the second standard to allow the signals to be transmitted between the expansion card and the motherboard.

7 Claims, 4 Drawing Sheets

EXPANSION APPARATUS FOR EXPANSION CARD ON MOTHERBOARD

BACKGROUND

1. Field of the Invention

The present invention relates to expansion card apparatuses, and more particularly to an expansion card apparatus for connecting an expansion card to a motherboard.

2. Description of Related Art

On a typical motherboard, an I/O (Input/output) chipset controls communications between the CPU and different peripheral components, such as expansion cards, and so on. These different peripheral components often comply with different signal transmission standards, such as PCI (Peripheral Component Interconnect) standard, PCI-E (Peripheral Component Interconnect Express) standard, and so on. However, the I/O chipset can't support every signal transmission standard. For example, if users want to add a PCI-E expansion card to a motherboard whose I/O chipset doesn't support PCI-E standard, a riser card is used to connect the PCI-E expansion card to the motherboard to transform PCI-E signals.

The riser card includes at least an expansion slot on one side thereof, and an edge with a series of signal pads attached thereon. The riser card is mounted upright on the motherboard with the edge inserted in a slot of the motherboard. An expansion card is inserted in the expansion slot of the riser card to indirectly connect to the motherboard, so the expansion card is located parallel to the motherboard. However, if a scale of the expansion card is too large, the expansion card may interfere with other components on the motherboard.

It is therefore desirable to find a new expansion card apparatus which can overcome the above mentioned problems.

SUMMARY OF THE INVENTION

An expansion card apparatus for expanding a motherboard which complies with a first signal transmission standard with an expansion card which complies with a second signal transmission standard, includes a first slot which complies with the first standard, a second slot which complies with the second standard, an expansion slot, and a transforming card. The first slot, the second slot, and the expansion slot are defined on the motherboard. The expansion slot is configured for receiving the expansion card and electrically connects to the second slot. The transforming card includes a first connector connecting with the first slot, a second connector connecting with the second slot, and a transforming chipset transforming form of signals between the first standard and the second standard to allow the signals to be transmitted between the expansion card and the motherboard.

Other advantages and novel features will be drawn from the following detailed description of preferred embodiments with attached drawings, in which:

DETAILED DESCRIPTION OF THE INVENTION

Figure 1:
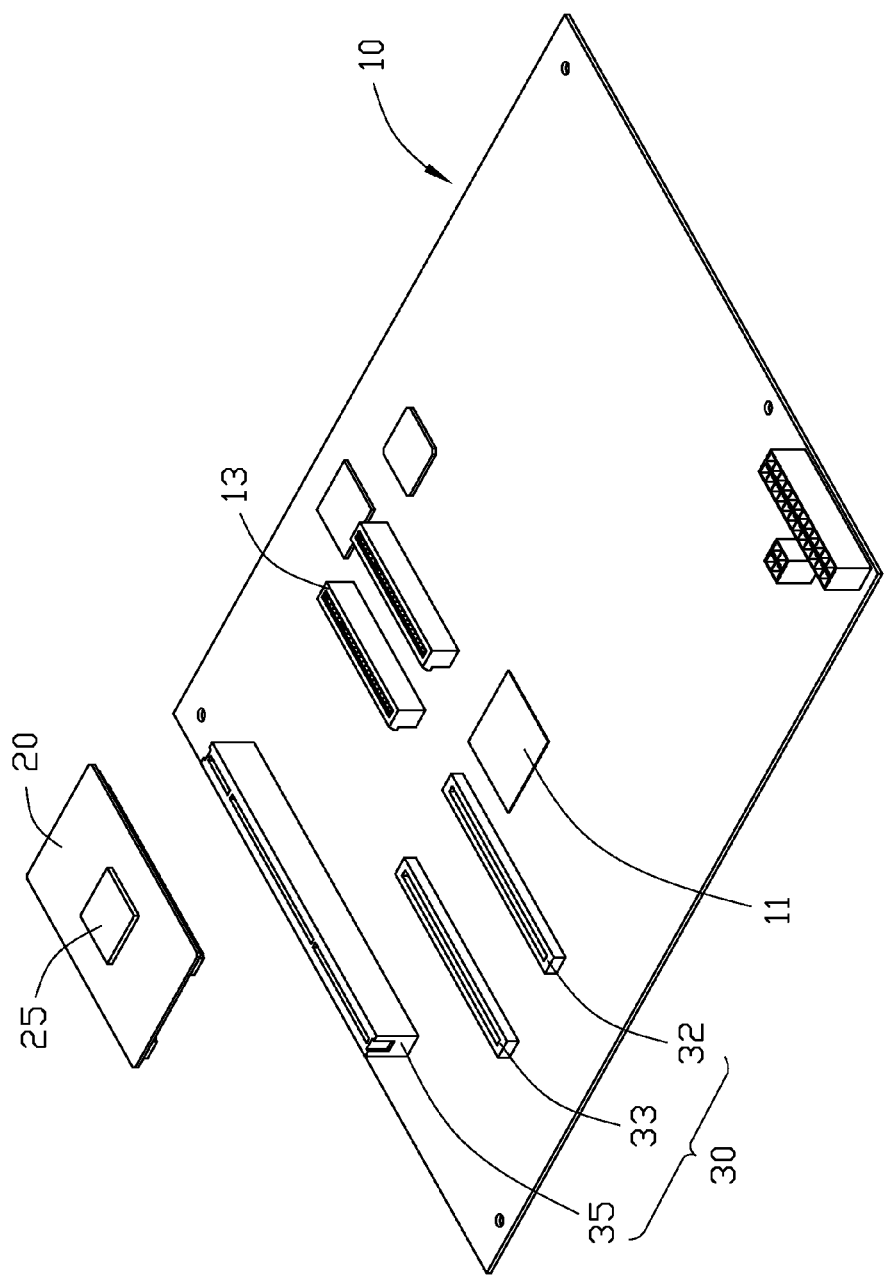
FIG. 1 is an exploded isometric view of a motherboard, and an expansion card apparatus in accordance with a preferred embodiment of the present invention including an expansion module and a transforming card.
Figure 2:
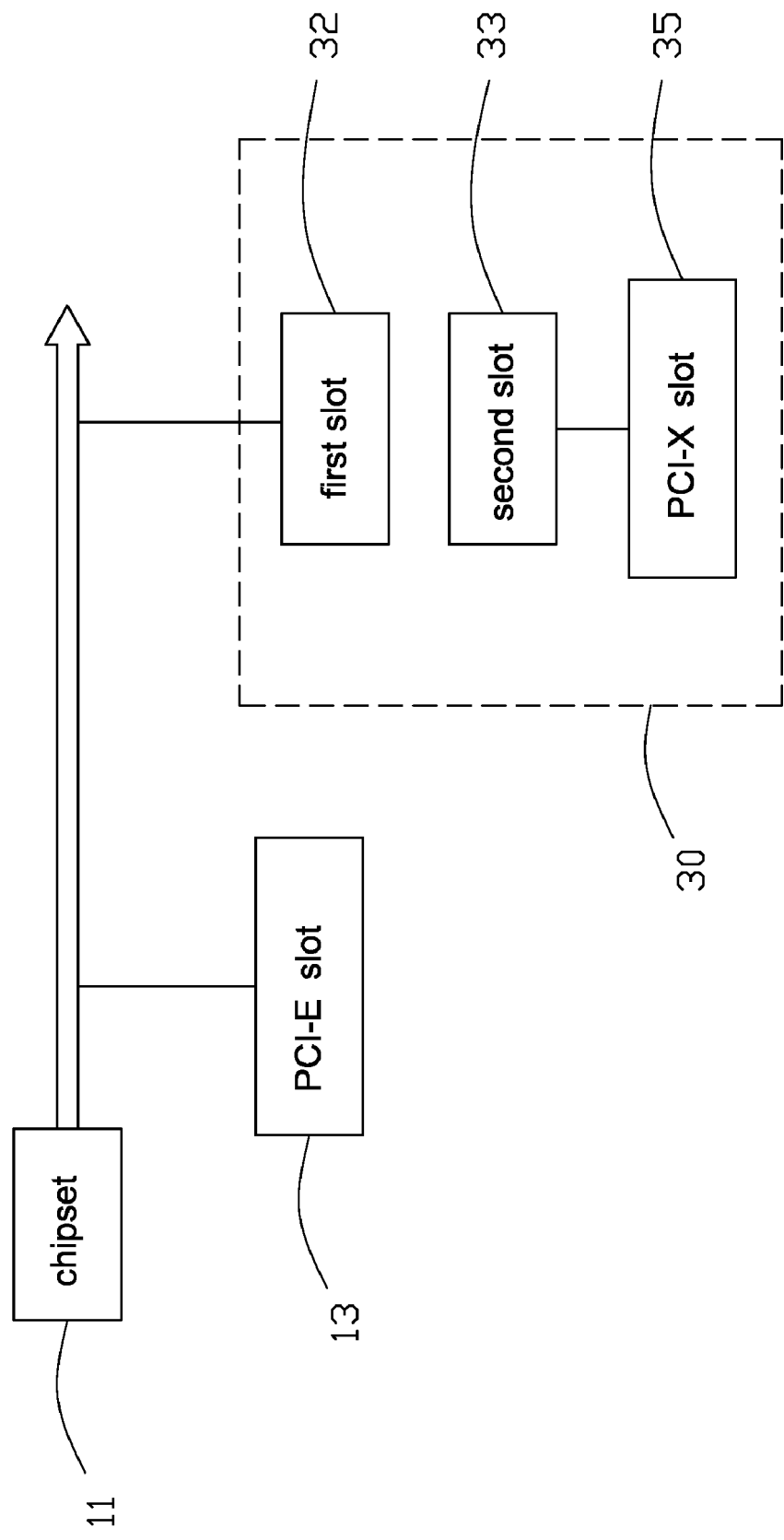
FIG. 2 is a block diagram of the expansion module of FIG. 1 connected to a chipset of the motherboard of FIG. 1.

Referring to FIGS. 1 and 2, an expansion card apparatus of a motherboard 10 in accordance with a preferred embodiment of the present invention includes a transforming card 20 and an expansion module 30.

The motherboard 10 includes an I/O chipset 11 attached thereon. In this embodiment the I/O chipset 11 only supports PCI-E signal transmission standard. A plurality of standard PCI-E slots 13 is set on the motherboard 10, and connected to the I/O chipset 11.

The expansion module 30 is set on the motherboard 10. The expansion module 30 includes a first slot 32 which complies with the PCI-E standard, a second slot 33 which complies with PCI-X (Peripheral Component Interconnect Extend) standard, and a standard PCI-X slot 35. The first slot 32 is electrically connected with the I/O chipset 11. The second slot 33 is electrically connected with the PCI-X slot 35.

Figure 3:
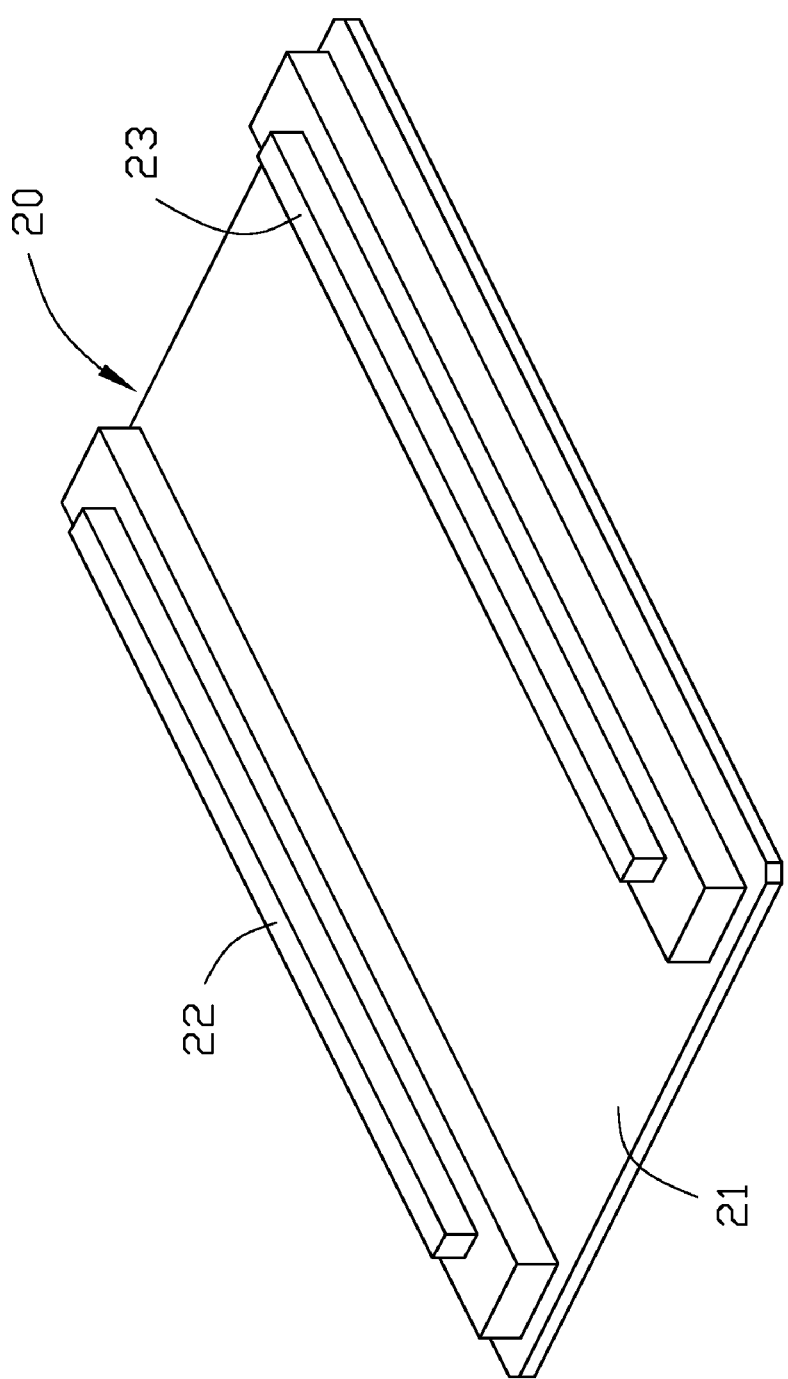
FIG. 3 is an isometric view of the transforming card of FIG. 1.

Referring to FIGS. 1 and 3, the transforming card 20 includes a circuit board 21. A first connector 22 and a second connector 23 are set on one side of the circuit board 21. The first connector 22 complies with the PCI-E standard, and is adapted to connect with the first slot 32. The second connector 23 complies with the PCI-X standard, and is adapted to connect with the second slot 33. A transforming chipset 25 is set on the other side of the circuit board 21, and electrically connected with the first and second connectors 22, 23. The transforming chipset 25 is configured to transform form of signals between the PCI-E standard and PCI-X standard.

Figure 4:
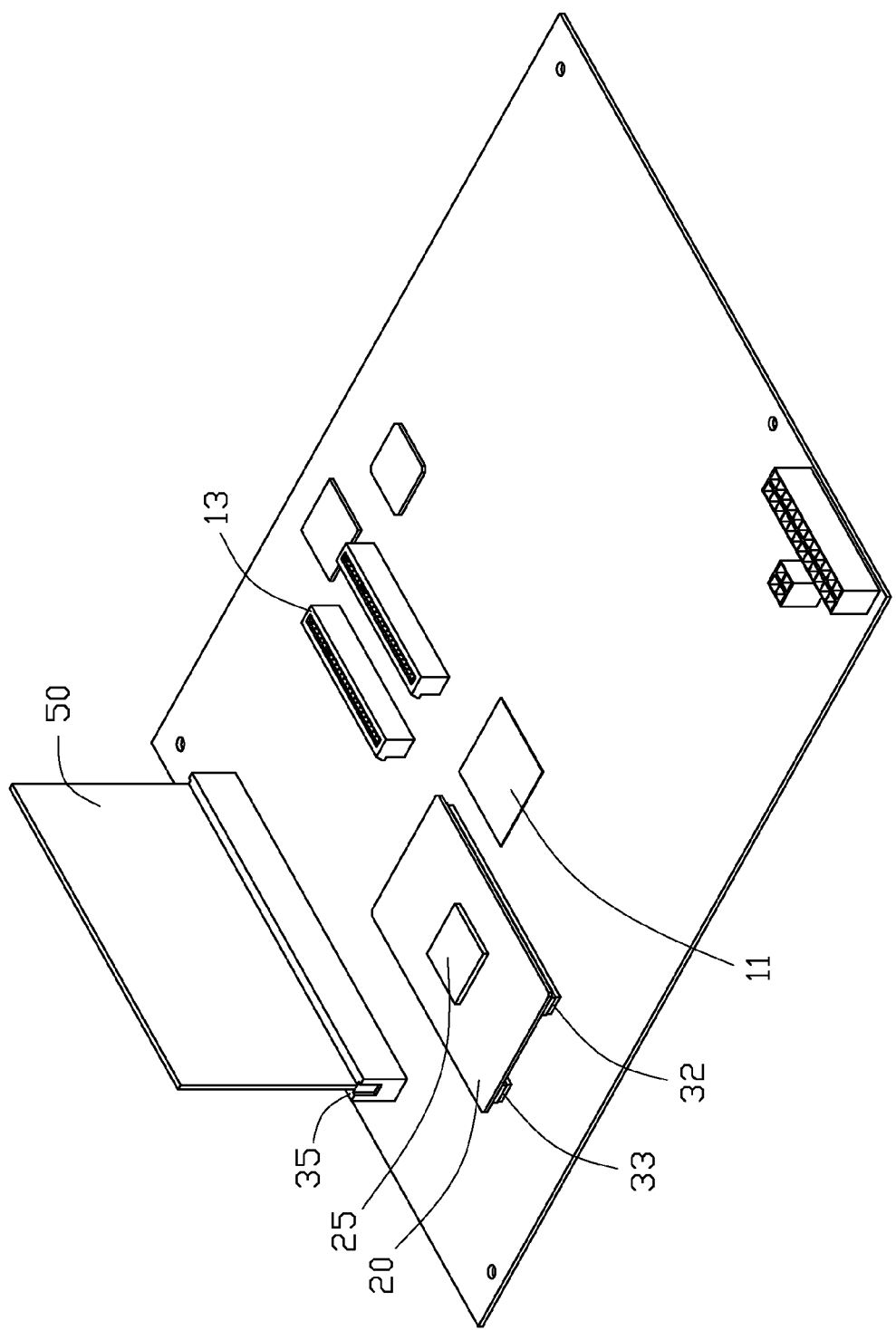
FIG. 4 is an assembled view of the expansion card apparatus and the motherboard of FIG. 1.

Referring to FIG. 4, the transforming card 20 is mounted on the motherboard 10 with the first connector 22 inserted into the first slot 32 and the second connector 23 inserted into the second slot 33. The circuit board 21 of the transforming card 20 is positioned parallel to the motherboard 10. The PCI-X slot 35 is electrically coupled to the I/O chipset 11 via the transforming card 20. An expansion card 50 is inserted in the PCI-X slot 35. For example, the I/O chipset 11 transmits a PCI-E standard signal to the expansion card 50. The signal is firstly transmitted to the first slot 32, and then to the transforming chipset 25. The transforming chipset 25 transforms the signal into PCI-X standard form. Then the transformed signal is transmitted to the expansion card 50 via the second slot 33 and the PCI-X slot 35.

If other expansion cards, such as an AGP (Accelerated Graphics Port) card, need to be mounted on the motherboard 10, a corresponding expansion module and transforming card, which transform signals between PCI-E standard and AGP standard, are provided to cooperate with the motherboard 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An expansion card apparatus for expanding a motherboard which complies with a first signal transmission standard with an expansion card which complies with a second signal transmission standard, the expansion card apparatus comprising:

a first slot defined on the motherboard which complies with the first standard;

a second slot defined on the motherboard which complies with the second standard;

an expansion slot defined on the motherboard configured to connect with the expansion card, the expansion slot complying with the second standard and electrically connecting with the second slot; and a transforming card comprising a first connector connecting with the first slot, a second connector connecting with the second slot, and a transforming chipset configured for transforming form of signals between the first standard and the second standard to allow the signals to be transmitted between the expansion card and the motherboard, wherein the first standard is PCI-E standard, and the second standard is PCI-X standard.

2. A motherboard assembly, comprising:

a motherboard comprising an I/O chipset which complies with a first signal transmission standard, and an expansion slot which complies with a second signal transmission standard;

an expansion card complying with the second standard, the expansion card vertically inserted in the expansion slot; and a transforming card attached to the motherboard and being parallel with the motherboard, the transforming card electrically coupling the expansion slot and the I/O chipset for transforming form of signals between the first and second standard to allow the signals to be transmitted between the expansion card and the I/O chipset, wherein the motherboard comprises a first slot complying with the first standard connected to the I/O chipset, and a second slot complying with the second standard connected to the expansion slot, the transforming card comprises a first connector connecting with the first slot, a second connector connecting with the second slot, and a transforming chipset electrically connecting the first connector with second connector for transforming form of the signals between the first standard and the second standard, the transforming card comprises a circuit board, and the first and second connectors are set on one side of the circuit board.

3. The motherboard assembly as described in claim 2, wherein the transforming chipset is mounted on an opposite side of the circuit board.

4. A motherboard assembly, comprising:

a motherboard comprising an I/O chipset which complies with a first signal transmission standard, a first expansion slot electrically connecting with the I/O chipset and configured to connect with a first expansion card which complies with the first signal transmission standard, a second expansion slot configured to connect with a second expansion card which complies with a second signal transmission standard; and a transforming card comprising a first connector electrically connecting with the I/O chipset, a second connector electrically connecting with the second expansion slot, and a transforming chipset electrically connecting the first connector with the second connector configured for transforming form of signals between the first standard and the second standard to allow the signals to be transmitted between the second expansion card and the I/O chipset.

5. The motherboard assembly as described in claim 4, wherein the motherboard defines a first slot receiving the first connector, and a second slot receiving the second connector.

6. The motherboard assembly as described in claim 4, wherein the transforming card comprises a circuit board on which the first and second connectors are mounted, the circuit board being substantially parallel to the motherboard.

7. The motherboard assembly as described in claim 6, wherein the first and second connectors are mounted on one side of the circuit board, and the transforming chipset is mounted on an opposite side of the circuit board.

* * * * *